Patented Oct. 29, 1935

2,018,817

UNITED STATES PATENT OFFICE 2,018,817

SOFT GLASS COMPOSITION OF HIGH ELECTRICAL RESISTANCE

William C. Taylor, Corning, N. Y., assignor to Corning Glass Works, Corning, N. Y., a corporation of New York No Drawing. Application October 23, 1933, Serial No. 694,889

3 Claims. (Cl. 106—36.1)

My invention has for its object to provide a new and useful glass having certain special characteristics fitting it for use as a material from which to make stems and flares of electric lamps.

The methods employed in the manufacture of these parts and the conditions under which they operate render the possession of the special characteristics highly valuable, and while the desirability of such characteristics has long been known and much research has been expended in connection therewith, no glass has heretofore been devised combining the desired characteristics to the extent that does the glass herein claimed.

The desired characteristics are:

A thermal coefficient of expansion of approximately .000009.

An electrical resistivity at a temperature of 350° C. of at least 108 x $10^6$ ohms per cm. cube, and preferably a higher resistance, say 211 x $10^6$.

A low softening point, i. e., 644° C., or less, the softening point being that temperature at which a thread of glass one millimeter in diameter and twenty-three centimeters long will elongate at the rate of one millimeter per minute when heated over the upper nine centimeters of its length.

A low specific gravity.

Any and all of these properties may easily be obtained at the sacrifice of others. The problem solved by me has been to obtain them all in one glass.

I have found that by using a small amount of lithia (not exceeding 1.2%) as one of the alkalis in a lead-potash soda glass containing a small amount of alumina and of a limited composition, I can obtain a glass of the desired property.

Barium oxide may be substituted in part for lead oxide with advantages in regard to cost, specific gravity, and electrical resistance, since its hardening effect is offset by the softening due to the use of lithia. Boric oxide which increases electrical resistance and also is useful for lowering the expansion coefficient likewise tends to harden the glass when substituted for alkali but may successfully be used in my glasses on account of the presence of lithia.

Pure lithium salts are expensive but certain lithium-containing ores, such as spodumene, lepidolite and amblygonite, may be used as a source of lithia and also as a source of the small amount of alumina which is required. Thus a small amount of lithia can very effectively be introduced without increasing costs. The question of cost may become of minor importance in consideration of the marked improvement due to the presence of lithia in the glass, particularly when it is desired to use a higher lithia content than can be obtained through the use of lithium ores alone.

The following glass compositions which were calculated from their respective batches will further illustrate my invention:

|  | A | B | C | D |
|---|---|---|---|---|
| $SiO_2$ | 58.1 | 58.4 | 58.2 | 56.0 |
| $PbO$ | 20.5 | 19.7 | 20.5 | 30.0 |
| $K_2O$ | 9.8 | 9.8 | 8.8 | 8.2 |
| $Na_2O$ | 3.0 | 2.9 | 3.0 | 3.5 |
| $Li_2O$ | .1 | 1.2 | 1.0 | .8 |
| $Al_2O_3$ | .8 | .5 | 1.0 | 1.5 |
| $BaO$ | 7.7 | 6.6 | 7.5 |  |
| $B_2O_3$ |  | .9 |  |  |
| Resistance in ohms per cm. cube at 350° C. | 161 x $10^6$ | 299 x $10^6$ | 211 x $10^6$ | 108 x $10^6$ |
| Softening point | 644° C. | 610° C. | 617° C. | 600° C. |
| Specific gravity | 2.984 | 2.97 | 2.967 | 3.073 |

It will be noted that the above glasses all have a much higher electrical resistance than prior glasses, yet the softening points with the exception of glass A are actually lower than prior softening points and the specific gravities are relatively low.

What I claim is:

1. A glass of high electrical resistance which contains 53 to 60% of silica, 18 to 30% of lead oxide, 8 to 10% of potassium oxide, 2.7 to 3.5% of sodium oxide, .1 to 1.2% of lithium oxide and aluminum oxide amounting to not more than 2%.

2. A glass of high electrical resistance which contains 53 to 60% silica, 18 to 30% of lead oxide, 8 to 10% of potassium oxide, 2.7 to 3.5% of sodium oxide, .1 to 1.2% of lithium oxide, aluminum oxide amounting to not more than 2% and 6 to 7.7% of barium oxide.

3. A glass of high electrical resistance which contains 53 to 60% of silica, 18 to 30% of lead oxide, 8 to 10% of potassium oxide, 2.7 to 3.5% of sodium oxide, .1 to 1.2% of lithium oxide, aluminum oxide amounting to not more than 2%, 6 to 7.7% of barium oxide and a small amount of boric oxide.

WILLIAM C. TAYLOR.